United States Patent
Ishii

(10) Patent No.: US 7,307,533 B2
(45) Date of Patent: Dec. 11, 2007

(54) INFORMATION READING APPARATUS, INFORMATION READING SYSTEM, AND RFID TAG

(75) Inventor: Hitoshi Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 11/169,774

(22) Filed: Jun. 30, 2005

(65) Prior Publication Data

US 2006/0181420 A1 Aug. 17, 2006

(30) Foreign Application Priority Data

Jan. 31, 2005 (JP) ............................. 2005-024555

(51) Int. Cl.
*G08B 13/14* (2006.01)

(52) U.S. Cl. ............... 340/572.1; 340/10.1; 340/10.51; 700/215

(58) Field of Classification Search ............ 340/372.1, 340/572.9; 235/375–385; 700/215, 221, 700/222, 224, 227
See application file for complete search history.

(56) References Cited

U.S. PATENT DOCUMENTS 5,886,634 A * 3/1999 Muhme ................... 340/572.1
6,232,877 B1 * 5/2001 Ashwin ................... 340/572.1
2001/0035816 A1 * 11/2001 Beigel et al. ............. 340/10.42
2004/0212480 A1 * 10/2004 Carrender et al. ....... 340/10.42

FOREIGN PATENT DOCUMENTS

| JP | 2000-272723 | 10/2000 |
|---|---|---|
| JP | 2004-246294 | 8/2004 |

* cited by examiner

*Primary Examiner*—Jeffery Hofsass
*Assistant Examiner*—Hoi C. Lau
(74) *Attorney, Agent, or Firm*—Westerman, Hattori, Daniels & Adrian, LLP.

(57) ABSTRACT

An information reading apparatus that reads first information stored in at least one first radio frequency identification tag and second information stored in a second radio frequency identification tag that belong to a first group. The first information includes second identification information of the second radio frequency identification tag, and the second information includes first identification information of the first radio frequency identification tag. The information reading apparatus includes a control unit that controls a reading unit to read the first information from one of the first radio frequency identification tags to obtain the second identification information, and to read, based on the second identification information obtained, the second information to obtain the first identification information of all of the first radio frequency identification tags that belong to the first group.

4 Claims, 12 Drawing Sheets

DETECTION OF PARENT TAG ACCORDING TO CONVENTIONAL TECHNIQUE

DETECTION OF PARENT TAG ACCORDING TO PRESENT INVENTION

FIG.2
DETECTION OF PARENT TAG ACCORDING TO CONVENTIONAL TECHNIQUE
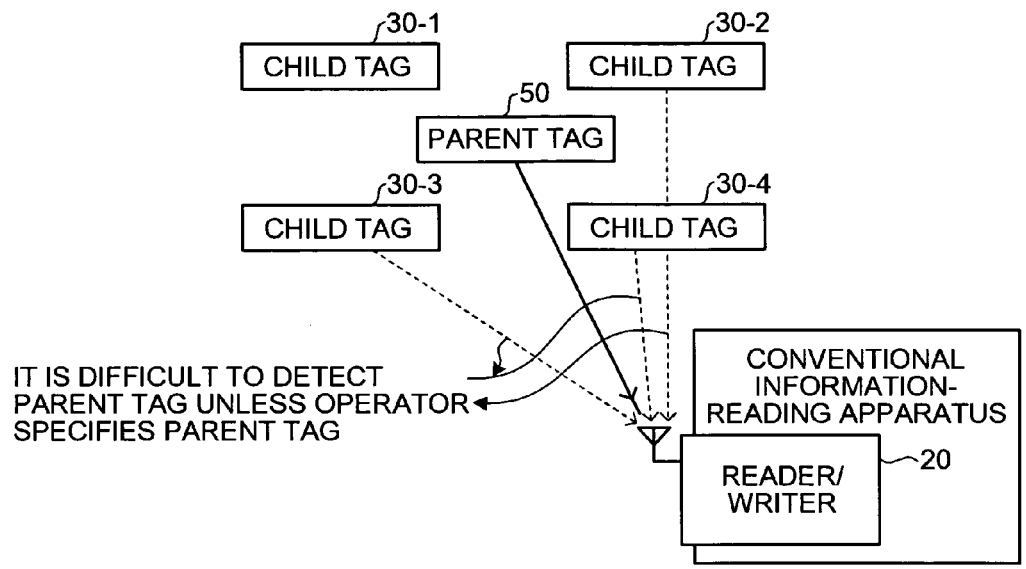
DETECTION OF PARENT TAG ACCORDING TO PRESENT INVENTION
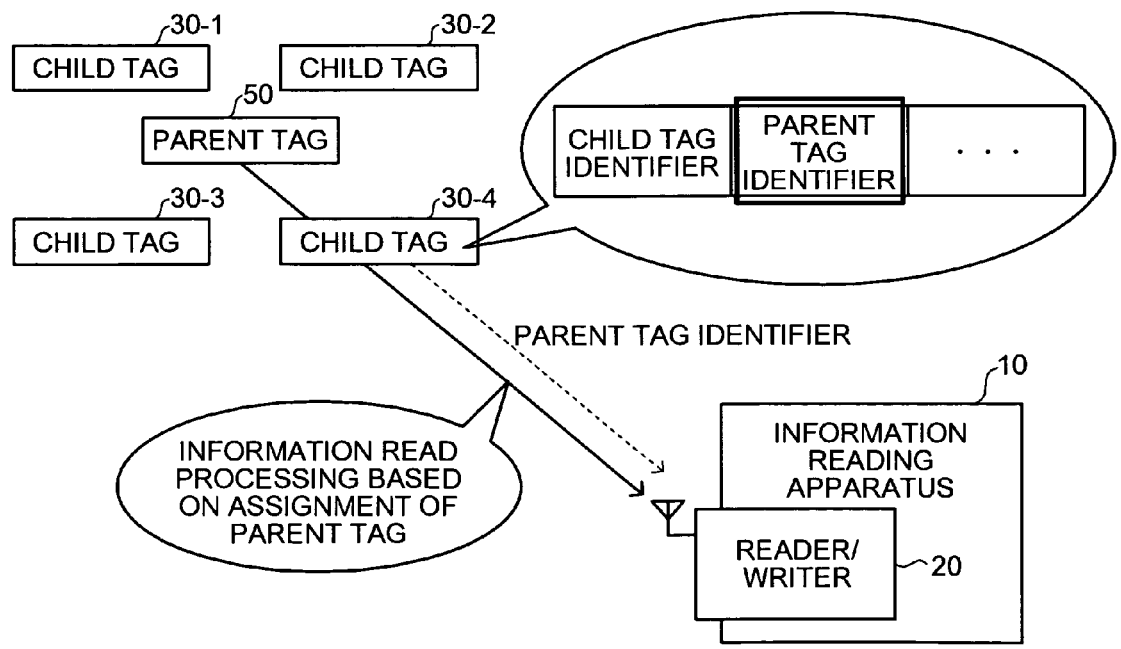

FIG.8
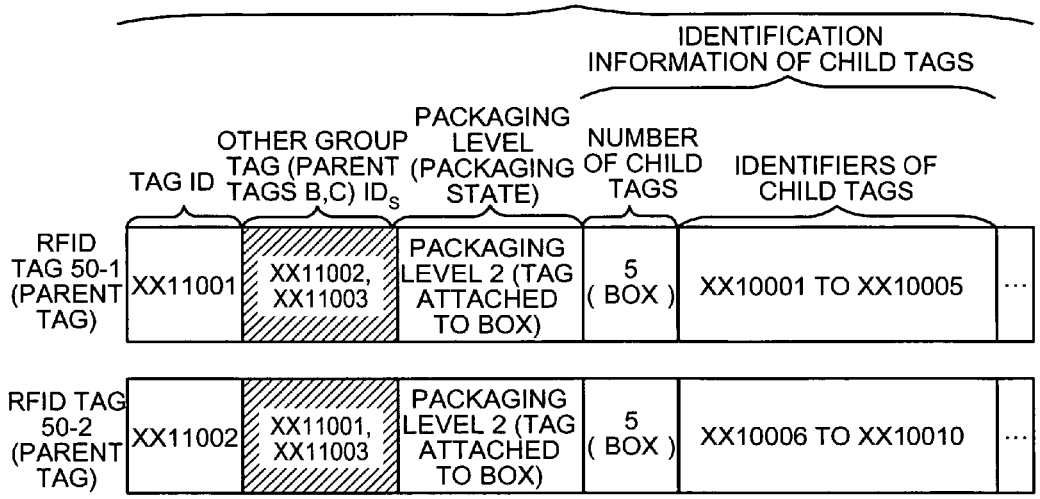
FIG. 9
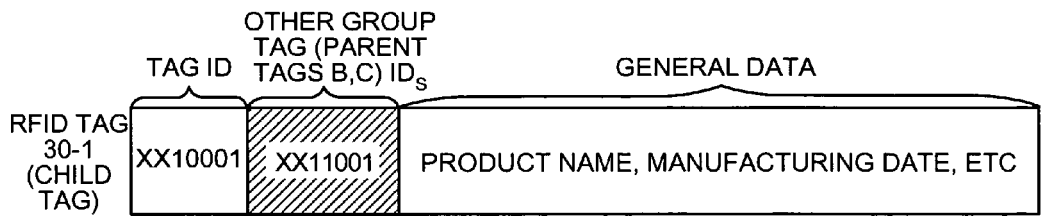

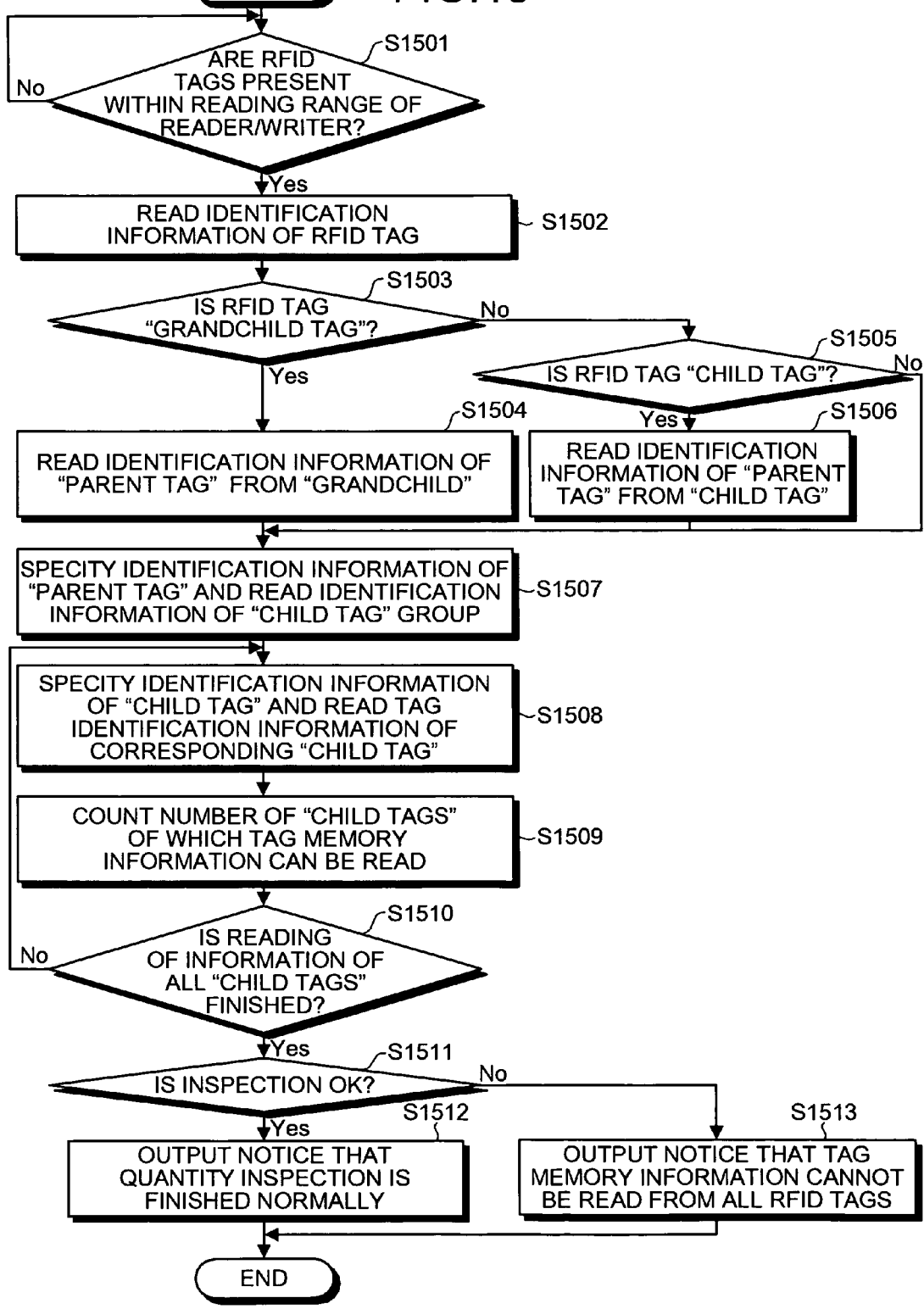

INFORMATION READING APPARATUS, INFORMATION READING SYSTEM, AND RFID TAG

BACKGROUND OF THE INVENTION

1. Field of the Invention

The present invention relates to a radio frequency identification (RFID) tag, an information reading apparatus that reads information stored in the RFID tag, and an information reading system that includes the RFID tag and the information reading apparatus.

2. Description of the Related Art

Recently, RFID tags are widely used in a distribution field. The RFID tag is an integrated circuit (IC) chip that stores various kinds of data. A data communication is performed together with a reader/writer that reads and writes data using an electric wave (for example, see Japanese Patent Application Laid-Open No. 2000-272723).

The RFID tag is often used to inspect a quantity of products (the number of products that are received and shipped) and a quality of products (good or bad). For example, the RFID tag is attached to each product, and the quantity is checked based on the number of RFID tags from which data can be read. Furthermore, the RFID tag is attached to each group of products, thereby managing the products by types of products or by modes of packaging.

However, when RFID tags attached to products of different groups are present in a mixed state, an information reading apparatus that reads information stored in the RFID tags cannot identify a product group to which each RFID tag belongs, unless the information reading apparatus has information on an identifier of each of the RFID tags (child tag) attached to each product and information on a group to which the product belongs. Therefore, the information reading apparatus cannot recognize the quantity of products per group, and inspection of the products cannot be performed.

To solve this problem, separately from the RFID tag attached to each product, a group RFID tag (parent tag) is attached to a corresponding product group in which the products are classified. The group RFID tag stores identification information of the RFID tags. The information reading apparatus first reads the identification information of the RFID tags from the group RFID tag, thereby identifying products belonging to each product group.

As explained above, according to the conventional technique disclosed in Japanese Patent Application Laid-Open No. 2000-272723, in the inspection of the products, it is necessary to first read the information stored in the group RFID tag to obtain the identification information of the RFID tag of each product.

However, in the above conventional technique, the group RFID tag cannot be identified automatically from among the RFID tags and the group RFID tags that are present in a mixed state. Therefore, when the RFID tag and the group RFID tag are mixed, an operator must arbitrarily choose the group RFID tag to be read. Specifically, it is required that the operator brings the reader/writer close to the group RFID tag, or a reading range of the reader/writer is narrowed such that the reader/writer reads only the group RFID tag.

SUMMARY OF THE INVENTION

It is an object of the present invention to at least solve the problems in the conventional technology.

An information reading apparatus according to one aspect of the present invention reads first information stored in at least one first radio frequency identification tag and second information stored in a second radio frequency identification tag that belong to a first group. The first information includes second identification information of the second radio frequency identification tag, and the second information includes first identification information of the first radio frequency identification tag. The information reading apparatus includes a control unit that controls a reading unit to read the first information from one of the first radio frequency identification tags to obtain the second identification information, and to read, based on the second identification information obtained, the second information to obtain the first identification information of all of the first radio frequency identification tags that belong to the first group.

An information reading system according to another aspect of the present invention includes at least one first radio frequency identification tag that is attached to at least one product, and that includes first identification information; a second radio frequency identification tag that is assigned to a predetermined group to which a plurality of the first radio frequency identification tags belong, and that includes second identification information; and an information reading apparatus that reads information stored in the first radio frequency identification tag and the second radio frequency identification tag. The first radio frequency identification tag includes a storage unit that stores the second identification information, and the information reading apparatus includes a control unit that controls a reading unit to read the second identification information stored in the storage unit from one of the first radio frequency identification tags, and to read, based on the second identification information read, the first identification information of all of the first radio frequency identification tags that belong to the predetermined group from the second radio frequency identification tag.

A radio frequency identification tag according to still another aspect of the present invention is attached to a product, and includes a storage unit that stores identification information of a group radio frequency identification tag of a group to which the radio frequency identification tag belongs; a communicating unit that transmits the identification information; and a control unit that controls the communicating unit to transmit the identification information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic for illustrating a concept of an information reading apparatus according to embodiments of the present invention;

FIG. 8 is a schematic for illustrating information stored in a parent tag;

FIG. 9 is a schematic for illustrating information stored in a child tag;

FIG. 15 is a flowchart of an information read processing according to the third embodiment.

DETAILED DESCRIPTION OF THE PREFERRED EMBODIMENTS

Exemplary embodiments of the present invention will be explained below with reference to the accompanying drawings. An inspection of products by confirming whether all data of RFID tags can be read at reception and shipment of the products are explained as an example. The RFID tags are attached to products, boxes in which the products are accommodated, or pallets on which the boxes are mounted.

A child tag used in the embodiments refers to an RFID tag that is attached to a product to be inspected. A parent tag refers to a group RFID tag that is attached to a group of the child tags. The group RFID tag stores an identifier of the RFID tag attached to each product, and information (for example, a packaging state of a product) on a group to which the product belongs, to specify the total number of the products to be inspected.

Figure 1:
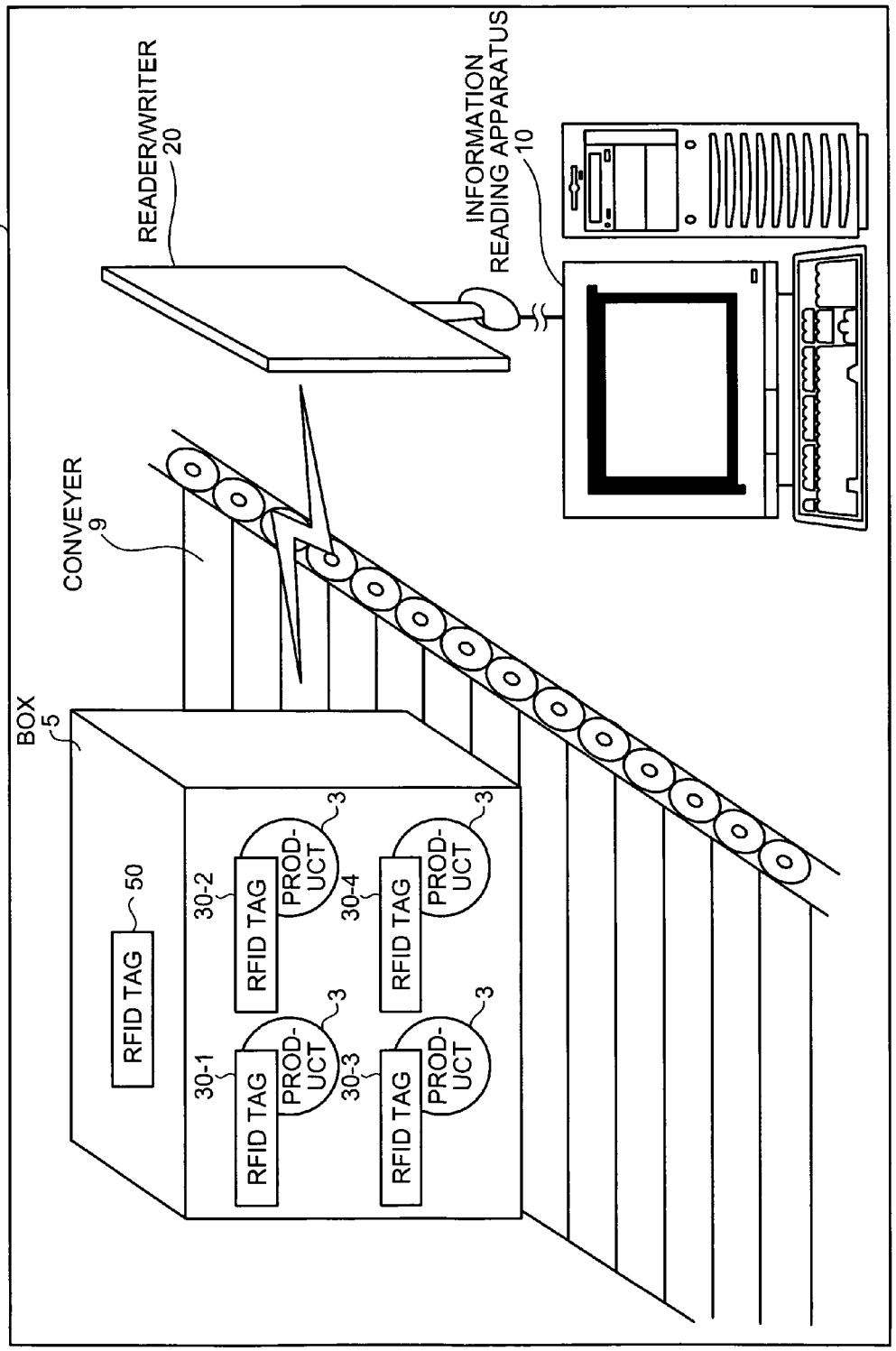
FIG. 1 is a schematic of an information reading system according to a first embodiment of the present invention.

FIG. 1 is a schematic of an information reading system according to a first embodiment of the present invention. FIG. 2 is a schematic for illustrating a concept of an information reading apparatus according to embodiments of the present invention. As shown in FIG. 1, an information reading system 1 includes a conveyer (carrying device) 9 that conveys a box 5 accommodating products 3, RFID tags 30-1 to 30-N (hereinafter referred to as "RFID tags 30" for convenience' sake) attached to the products 3, a group RFID tag 50 attached to the box 5, a reader/writer 20 that reads information stored in the RFID tags 30 and the group RFID tag 50, and an information reading apparatus 10 that controls the reader/writer 20.

The information reading apparatus 10 performs an information read processing. In the information read processing, identification information of the group RFID tag 50 stored in one of the RFID tags 30 is read. Based on the identification information of the group RFID tag 50 read, identification information of the RFID tags 30 that belongs to a group to which the RFID tag 30, from which the identification information of the group RFID tag 50 is read, belongs from the group RFID tag 50. Thus, even when the RFID tag and the group RFID tag are present in a mixed state, the group RFID tag can be recognized automatically.

In the information reading system 1, the RFID tags 30, which are the child tags, store the identification information of the group RFID tag 50, which is the parent tag. Such an arrangement in which the child tag, of which an absolute number is larger than that of the parent tag, stores the identification information of the parent tag, realizes quick recognition of the parent tag by the information reading apparatus 10.

The information reading apparatus 10 also controls to read the identification information of the group RFID tag 50 stored in each RFID tag 30, and to specify, based on the identification information of the group RFID tag 50 read, the group RFID tag 50. From the RFID tag 50 specified, identification information of a group of the RFID tags 30 is read. Therefore, the information of the parent tag can be read quickly from among RFID tags in which the parent tag and the child tags are present in a mixed state.

Therefore, the information of the parent tag (that is, the identification information of the group of the child tags) can be read from among the RFID tags in which the parent tag and the child tags are present in a mixed state, without requiring the operator to arbitrarily choose the group RFID tag to be read, unlike the conventional technique (see FIG. 2). Accordingly, even when the RFID tag attached to each product and the group RFID tag attached to the product group are present in a mixed state, the group RFID tag can be automatically recognized. By quickly recognizing the parent tag, even when the number of RFID tags increases, products can be inspected efficiently without a delay or a reading error in the inspection processing, for example, in an inspection of quantity and quality, unlike an anti-collision detection system.

Figure 3:
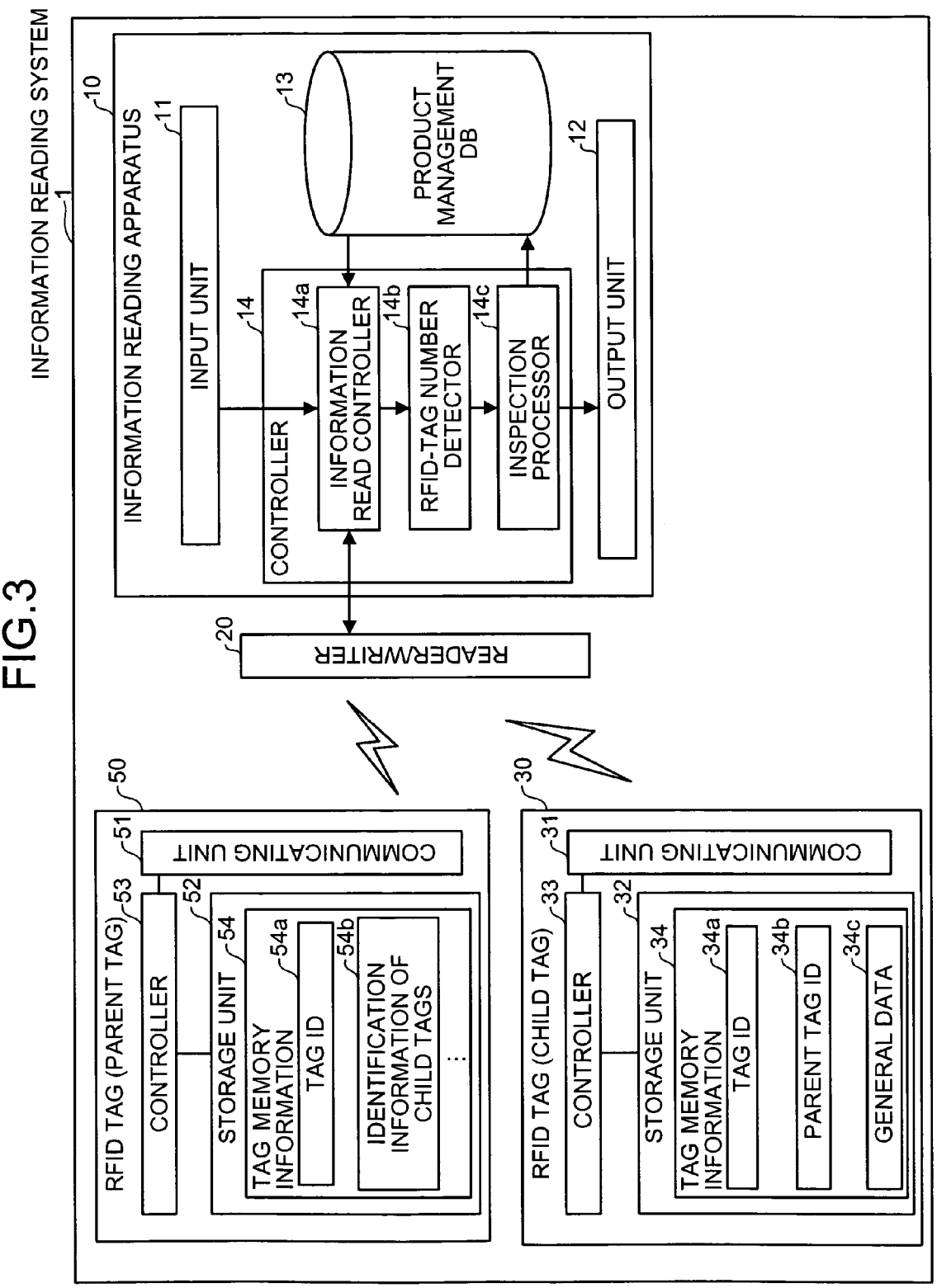
FIG. 3 is a block diagram of the information reading apparatus and an RFID tag according to the first embodiment.

FIG. 3 is a block diagram of the information reading apparatus and the RFID tags according to the first embodiment. As shown in FIG. 3, the information reading system 1 includes the information reading apparatus 10, the reader/writer 20 that reads and writes data to and from the RFID tag, the RFID tag 30, and the RFID tag 50.

The RFID tags 30 and 50 are IC chips that store various kinds of data. The RFID tags 30 and 50 include communicating units 31 and 51 respectively that carry out data communications, using an electric wave, with the reader/writer 20 disposed in the information reading apparatus 10, storage units 32 and 52 respectively that store tag memory information, and controllers 33 and 53 respectively that control exchanges of various kinds of data. The storage unit 32 of the RFID tag 30 stores tag memory information 34, and the storage unit 52 of the RFID tag 50 stores tag memory information 54.

Figure 4:
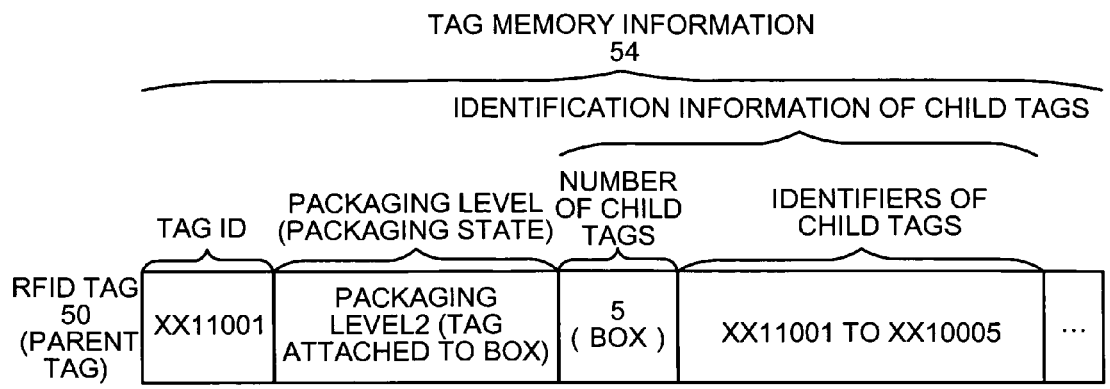
FIG. 4 is a schematic for illustrating information stored in a parent tag.

The RFID tag 50 stores information including a tag identification (ID) 54a and identification information 54b of a child tag, as the tag memory information 54. Specifically, as shown in FIG. 4, the tag memory information 54 includes a tag ID "XX11001" of the parent tag, a packaging level "2", and identification information of child tags, that is, the number of child tags "5", and identifiers of these child tags "XX10001" to "XX10005". The tag ID uniquely identifies the RFID tag. The packaging level is a mode of packaging of the product 3. For example, a packaging level "1" indicates the product 3 itself, and the packaging level "2" indicates the box 5 in which the products 3 are accommodated.

Figure 5:
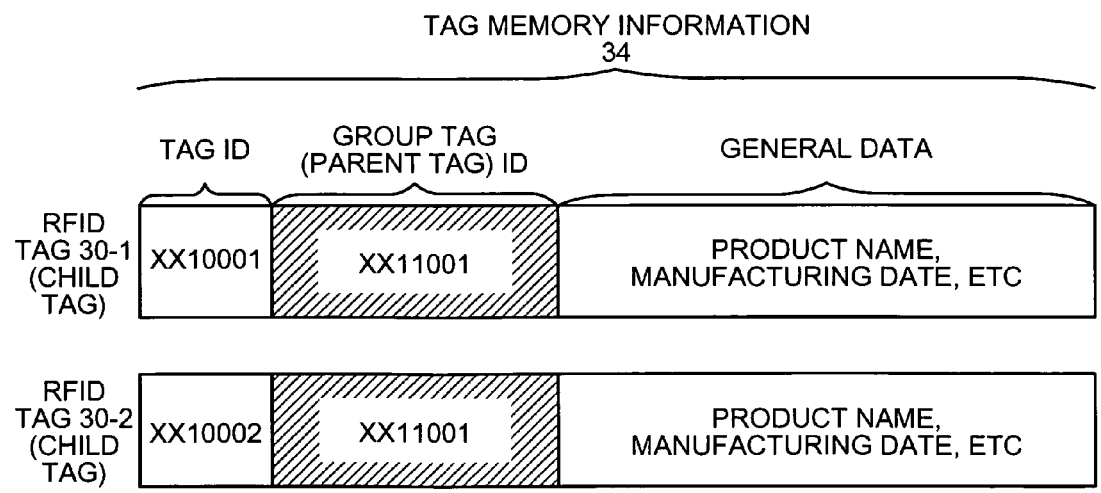
FIG. 5 is a schematic for illustrating information stored in a child tag.

The RFID tag 30 stores information including a tag ID 34a, a parent tag ID 34b, and general data 34c, as the tag memory information 34. For example, as shown in FIG. 5, an RFID tag 30-1 stores the tag ID 34a "XX10001" of the child tag, the tag ID "XX11001" of the parent tag attached to the box 5, and general data such as attribute information (for example, information of a product name and a manufacturing date) concerning the product 3.

The information reading apparatus 10 controls to read information stored in the RFID tag 30 and the group RFID tag 50 attached to a group of the RFID tag 30, and includes an input unit 11, an output unit 12, a product management database (DB) 13, and a controller 14.

The input unit 11 is an instruction input unit such as a keyboard, a mouse, and a trackball that are used to input various kinds of information. For example, the input unit 11 receives input of information on the packaging level, and receives input of an instruction of a re-inspection when an inspection processor 14c does not normally inspect the product 3.

The output unit 12 is an output display unit such as a monitor that outputs various kinds of information. For example, the output unit 12 outputs a result of inspection carried out by the inspection processor 14c. The product management DB 13 is used to store information to manage the product 3. For example, a state of inspection performed on the product 3 at the time of the reception and shipment by the inspection processor 14c is stored in the product management DB 13.

The controller 14 has an internal memory that stores a control program, such as an operating system (OS), a program that prescribes various processing procedures, and required data. The controller 14 executes various kinds of processing using the information stored in the internal memory. Particularly, the controller 14 includes an information read controller 14a, an RFID-tag number detector 14b, and the inspection processor 14c, which are closely relevant to the present invention.

The information read controller 14a controls to read information from the RFID tag via the reader/writer 20. Specifically, the information read controller 14a controls to read the identification information of the group RFID tag 50 stored in the RFID tag 30, and to read the identification information of the RFID tags from the group RFID tag 50, based on the identification information read of the group RFID tag 50. In the first embodiment, an example of reading information of one RFID tag at one time of communication is explained. However, the present invention is not limited to this method, and it is also possible to read information of a plurality of RFID tags (for example, odd number tag IDs or even number tag IDs) at one time of communication in a similar manner.

Specifically, when it is detected that the box 5 is conveyed to the reading range of the reader/writer 20 by the conveyer 9, the information read controller 14a controls the reader/writer 20 to read a field of identification information of arbitrary one of the RFID tags. The information read controller 14a determines whether the RFID tag is a child tag, based on the packaging level "2" (group tag flag) specified in advance as a parent tag.

In this case, when the RFID tag of which identification information is read indicates a child tag, that is, when the RFID tag has no field of a packaging level (when the packaging level is "1"), the information read controller 14a controls the reader/writer 20 to read the identification information "XX11001" of the group RFID tag 50 stored in the RFID tag 30.

The information read controller 14a specifies the identifier, "XX11001" of the RFID tag 50, and controls to read the identification information (that is, the number of child tags "5", and the identifiers "XX10001" to "XX10005" of the child tags) of the RFID tags 30 stored in the RFID tag 50 having the identifier "XX11001".

The information read controller 14a then specifies an identifier of the RFID tag 30, for example, the RFID tag 30-1, and controls to read the tag memory information 34 stored in the RFID tag 30-1. The information read controller 14a repeats the read processing of the tag memory information 34 until when all the tag memory information 34 stored in the RFID tags 30 having identifiers "XX10001" to "XX10005" are read.

The RFID-tag number detector 14b detects the number of the RFID tags 30 from which the reader/writer 20 could read the tag memory information based on the read instruction sent from the information read controller 14a. Specifically, the RFID-tag number detector 14b increments the count number of a counter each time when the tag memory information 34 stored in the RFID tag 30 is read.

The inspection processor 14c inspects the product 3. For example, the inspection processor 14c compares the number "5" of the child tags obtained from the RFID tag 50 with the total number of RFID tags detected by the RFID-tag number detector 14b, and outputs a result of the comparison about whether both numbers coincide with each other, to the output unit 12.

When the numbers of the RFID tags coincide with each other, it means that the tag memory information 34 of all the products 3 accommodated in the box 5 has been read. In this case, the inspection processor 14c outputs a notice that the quantity inspection is finished normally, to the output unit 12.

On the other hand, when the numbers of the RFID tags do not coincide with each other, it means that the tag memory information 34 of all the products 3 in the box 5 has not been read. In this case, the inspection processor 14c outputs an error message to the output unit 12, thereby urging the operator to re-inspect the RFID tags 30.

Figure 6:
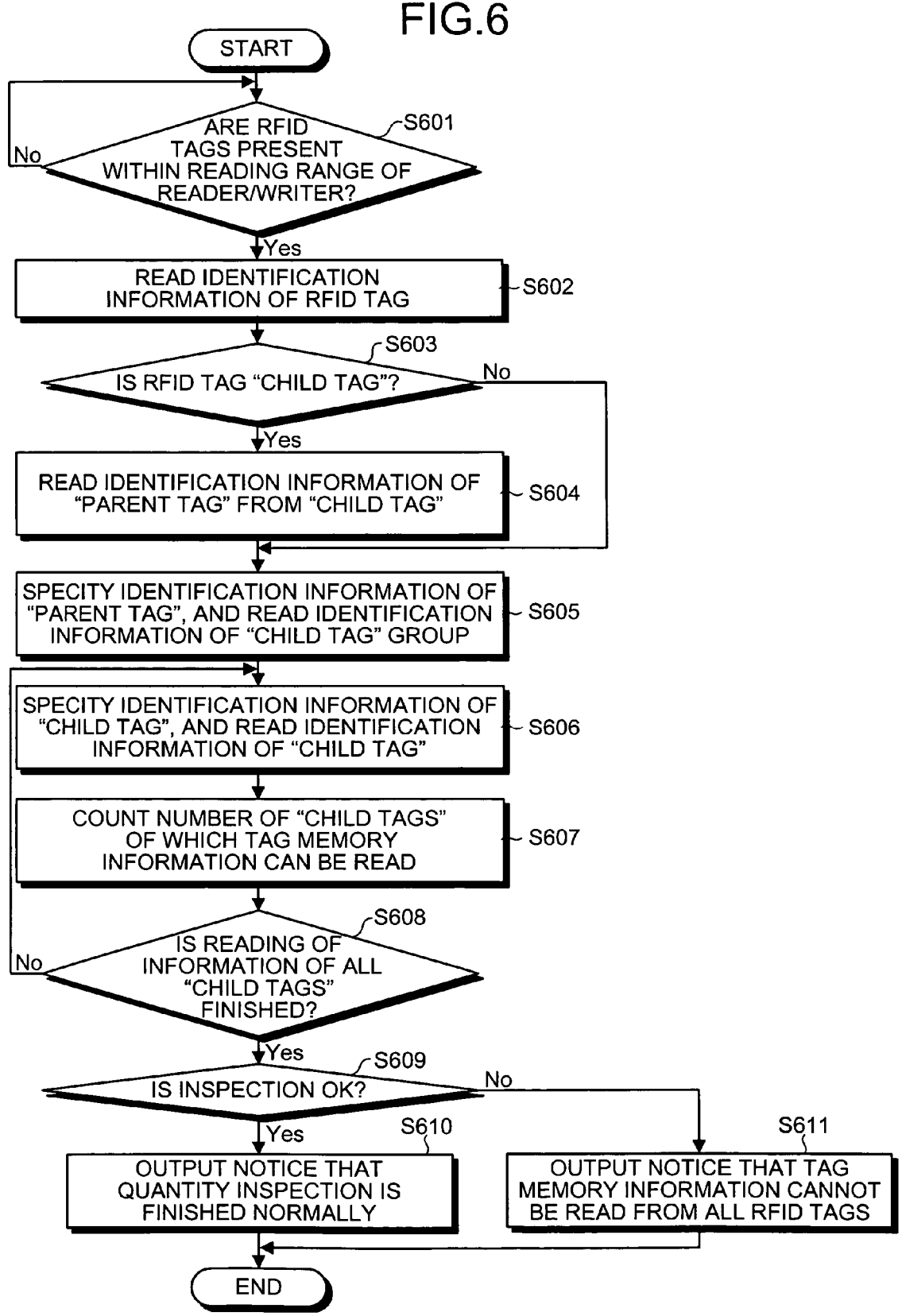
FIG. 6 is a flowchart of an information read processing according to the first embodiment.

FIG. 6 is a flowchart of the information read processing according to the first embodiment. As shown in FIG. 6, when it is detected that the box 5 is conveyed to the reading range of the reader/writer 20 by the conveyer 9 ("YES" at step S601), the information read controller 14a controls the reader/writer 20 to read the field of identification information of an arbitrary one of the RFID tags (step S602).

The information read controller 14a determines whether the RFID tag is a child tag, based on the packaging level "2" (group tag flag) specified in advance as a parent tag (step S603).

In this case, when the RFID tag of which identification information is read is a child tag ("YES" at step S603), that is, when the RFID tag has no field of a packaging level (when the packaging level is "1"), the information read controller 14a controls the reader/writer 20 to read the identification information "XX11001" of the group RFID tag 50 stored in the RFID tag 30 (step S604).

The information read controller 14a specifies the identifier of the RFID tag 50, and controls to read the identification information (that is, the number of child tags "5", and the identifiers "XX10001" to "XX10005" of the child tags) of the RFID tags from this RFID tag 50 (step S605).

The information read controller 14a then specifies an identifier of the RFID tag 30, for example, the RFID tag 30-1, and controls to read the tag memory information 34 stored in the RFID tag 30-1 (step S606). The RFID-tag number detector 14b increments the count number of the counter each time when the tag memory information 34 stored in the RFID tag 30 is read (step S607).

The information read controller 14a repeats the read processing of the tag memory information 34 stored in this child tag until when all the identifiers "XX10001" to "XX10005" of the child tags are read (step S608).

When the reading of the tag memory information 34 of all the identifiers "XX10001" to "XX10005" of the child tags are read ("YES" at step S608), the inspection processor 14c compares the number "5" of the child tags obtained from the RFID tag 50 with the total number of RFID tags detected by the RFID-tag number detector 14*b*, and determines whether both numbers coincide with each other (step S609).

When the numbers of the RFID tags coincide with each other ("YES" at step S609), the inspection processor 14*c* outputs a notice that the quantity inspection is finished normally, to the output unit 12 (step S610). On the other hand, when the numbers of the RFID tags do not coincide with each other ("NO" at step S609), the inspection processor 14*c* outputs an error message to the output unit 12 (step S611), and ends the processing.

As explained above, according to the first embodiment, the information reading apparatus 10 can quickly read the information of the parent tag (that is, the identification information of the child tag group) from among the RFID tags in which the parent tag and the child tags are present in a mixed state. Accordingly, even when the RFID tag attached to each product and the group RFID tag attached to the corresponding product group are present in a mixed state, the group RFID tag can be automatically recognized.

By quickly recognizing the parent tag, even when the number of tags increases, products can be inspected efficiently without a delay or a reading error in the inspection processing (for example, an inspection processing of quantity and quality), unlike the anti-collision detection system.

Figure 7:
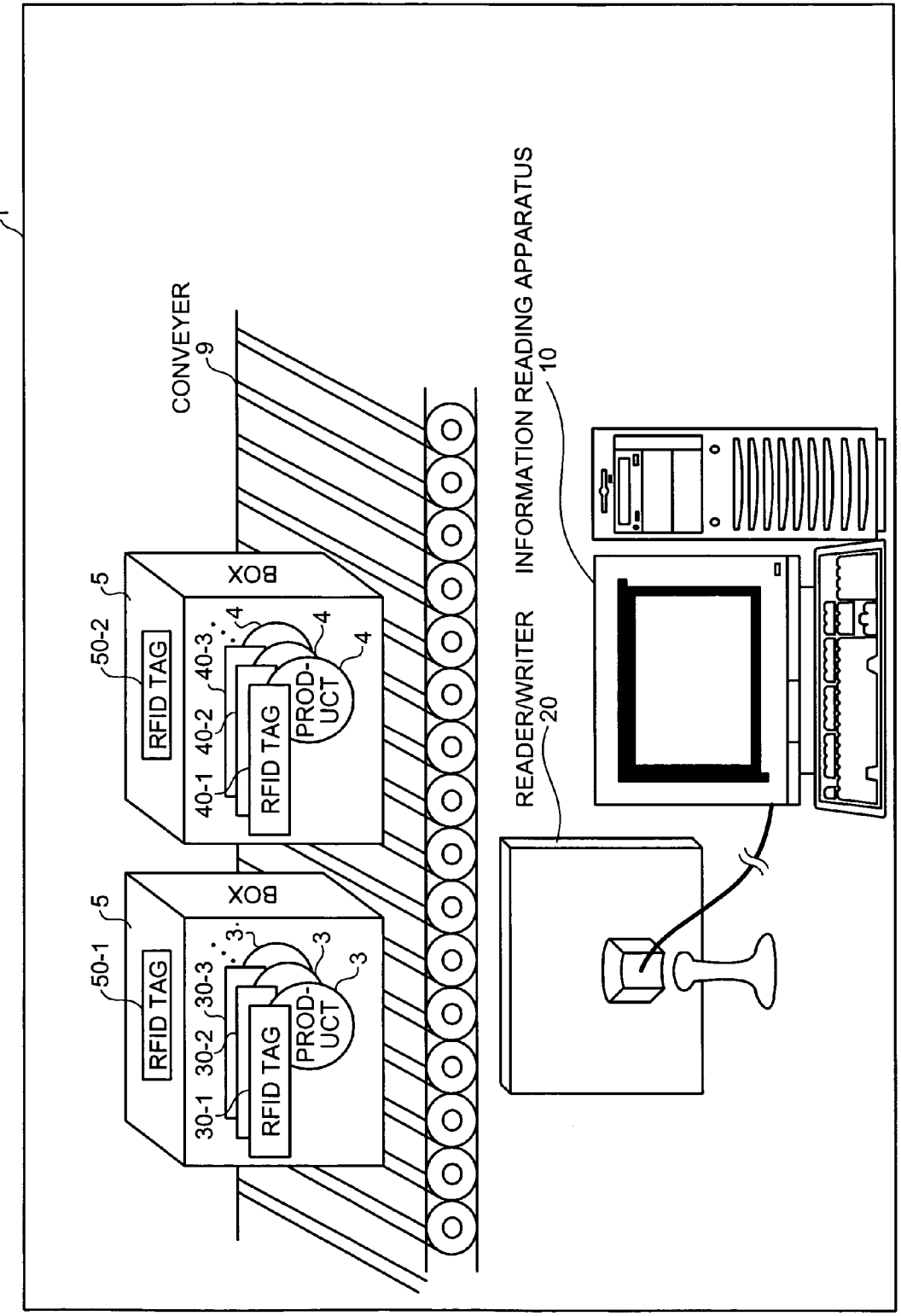
FIG. 7 is a schematic of an information reading system according to a second embodiment of the present invention.

FIG. 7 is a schematic of an information reading system according to a second embodiment of the present invention. While products to be inspected are accommodated in one box in the first embodiment, products to be inspected are accommodated in more than one box 5 to which the RFID tag 50 is attached as shown in FIG. 7 in the second embodiment.

The information reading apparatus 10 according to the second embodiment controls to read identification information of the RFID tag 50 from the RFID tag 30, and controls to read, based on the identification information of the RFID tag 50 read, identification information of a group of RFID tags (parent tags) from the RFID tag 50.

Thus, in the information reading apparatus 10, the identification information of a group of parent tags to be read are obtained from one of the parent tags to prevent an error in reading information stored in the parent tags other than the parent tag, from which the identification information is read, and information stored in a child tag that belongs to the parent tag.

Only the differences from the first embodiment are explained below, and parts similar to those of the first embodiment are not explained. In the second embodiment, the tag memory information 54 and 34 stored in the parent tag and in the child tag are different from those according to the first embodiment.

The RFID tag 50 stores information including the tag ID 54*a*, other parent tag ID 54*c*, and the identification information 54*b* of a child tag group, as the tag memory information 54. For example, as shown in FIG. 8, an RFID tag 50-1 stores a tag ID "XX11001" of the parent tag, tag IDs of other parent tags, that is, a tag ID "XX11002" of a parent tag 50-2, and a tag ID "XX11003" of a parent tag 50-3, the packaging level "2", and the identification information of a child tag group, that is, the number "5" of child tags, and the identifiers "XX10001" to "XX10005" of the child tags.

Similarly, as shown in FIG. 8, the RFID tag 50-2 stores the tag ID "XX11002" of the parent tag, tag IDs of other parent tags, that is, the tag ID "XX11001" of the parent tag 50-1, and the tag ID "XX11003" of the parent tag 50-3, the packaging level "2", and the identification information of a child tag group, that is, the number "5" of child tags, and identifiers "XX10006" to "XX10010" of the child tags.

The RFID tag 30 stores information including the tag ID 34*a*, the parent tag ID 34*b*, and the general data 34*c*, as the tag memory information 34. For example, as shown in FIG. 9, the RFID tag 30-1 stores the tag ID 34*a* "XX10001" of the child tag, the tag ID "XX11001" of the parent tag attached to the box 5, and general data such as attribute information (for example, information of a product name and a manufacturing date) of the product 3.

Similarly, an RFID tag 40-1 stores a tag ID 44*a* "XX10006" of the child tag, the tag ID "XX11002" of the parent tag, and general data such as attribute information of the product 3.

Figure 10:
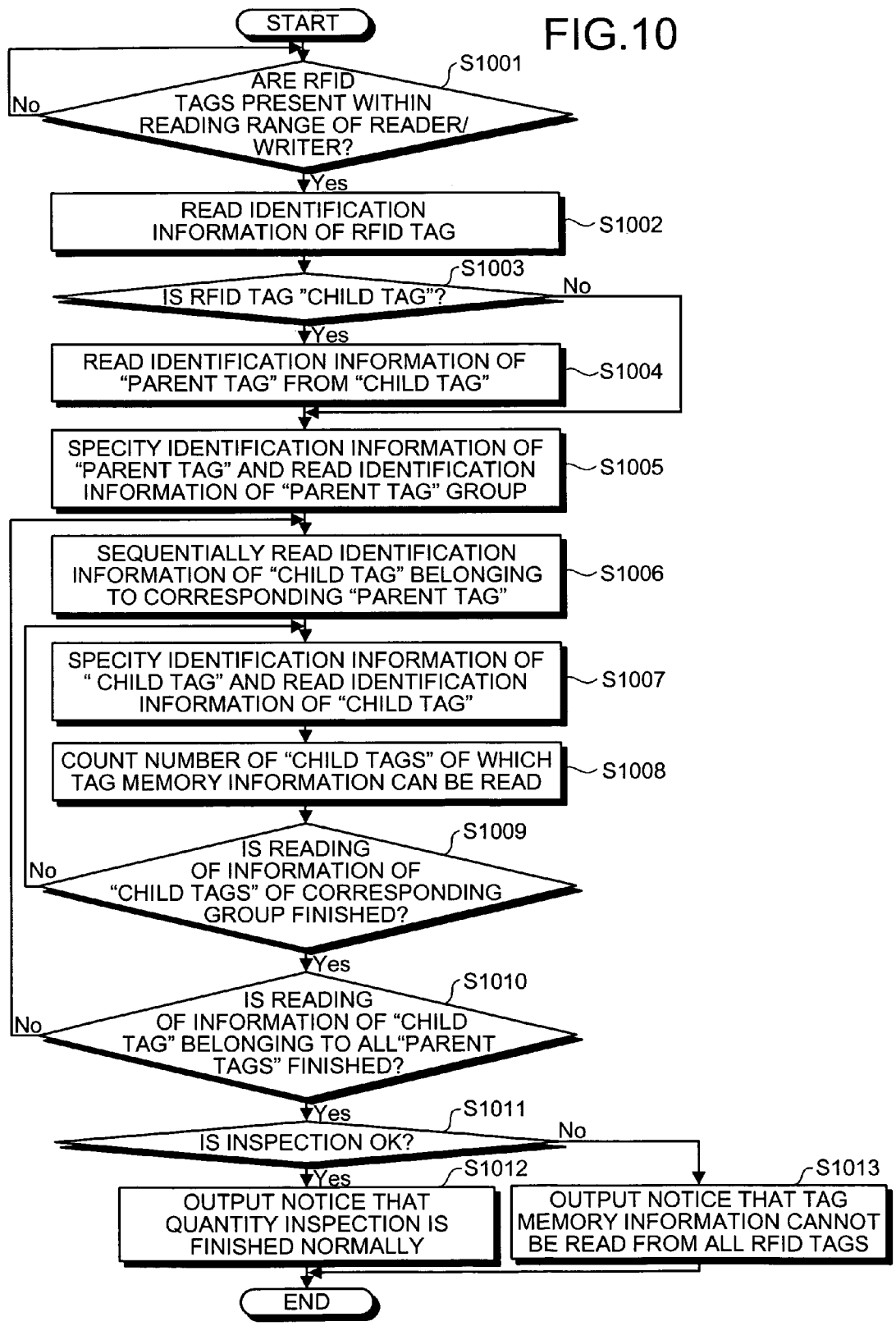
FIG. 10 is a flowchart of an information read processing according to the second embodiment.

FIG. 10 is a flowchart of the information read processing according to the second embodiment. As shown in FIG. 10, when it is detected that the box 5 is conveyed to the reading range of the reader/writer 20 by the conveyer 9 ("YES" at step S1001), the information read controller 14*a* controls the reader/writer 20 to read the field of identification information of an arbitrary one of RFID tags (step S1002).

The information read controller 14*a* determines whether the RFID tag is a child tag, based on the packaging level "2" (group tag flag) specified in advance as a parent tag (step S1003).

In this case, when the RFID tag of which identification information is read is a child tag (for example, the RFID tag 30-1) ("YES" at step S1003), the information read controller 14*a* controls the reader/writer 20 to read the identification information "XX11001" of the group RFID tag 50-1 stored in the RFID tag 30-1 (step S1004).

The information read controller 14*a* specifies the identifier "XX11001" of the RFID tag 50-1, and controls to read the identification information of other parent tags, that is, "XX11002" and "XX11003", from this RFID tag 50-1 (step S1005).

The information read controller 14*a* then controls to read the identification information (that is, the number "5" of child tags, and the identifiers "XX10001" to "XX10005" of the child tag groups) of the child tag groups belonging to the RFID tag 50-1 (step S1006).

The information read controller 14*a* then specifies an identifier of the RFID tag 30, for example, the RFID tag 30-1, and controls to read the tag memory information 34 stored in the RFID tag 30-1 (step S1007). The RFID-tag number detector 14*b* increments the count number of the counter each time when the tag memory information 34 stored in the RFID tag 30 is read (step S1008).

The information read controller 14*a* repeats the read processing of the tag memory information 34 stored in this child tag until when all the identifiers "XX10001" to "XX10005" of the child tags are read (step S1009).

When the reading of the tag memory information 34 of all the identifiers "XX10001" to "XX10005" of the child tags are read ("YES" at step S1009), the processing at steps S1006 to S1009 are repeated until when the read processing of child tags belonging to other parent tags 50-2 and 50-3 is finished ("YES" at step S1010).

When the read processing of the child tags belonging to all the parent tags 50-1, 50-2, and 50-3 is finished ("YES" at step S1010), the inspection processor 14*c* compares a number "15" of the child tags obtained from the RFID tags (parent tags) 50-1, 50-2, and 50-3 with the total number of RFID tags detected by the RFID-tag number detector 14*b*, and determines whether both numbers coincide with each other (step S1011).

When the numbers of the RFID tags coincide with each other ("YES" at step S1011), the inspection processor 14c outputs a notice that the quantity inspection is finished normally, to the output unit 12 (step S1012). On the other hand, when the numbers of the RFID tags do not coincide with each other ("NO" at step S1011), the inspection processor 14c outputs an error message to the output unit 12 (step S1013), and ends the processing.

As explained above, according to the second embodiment, the information reading apparatus 10 can read the identification information of a group of the parent tags to be read, from one of the parent tags. Thus, an error in reading information stored in the parent tags other than the parent tag, from which the identification information is read, and information stored in a child tag belonging to the parent tag is prevented.

Figure 11:
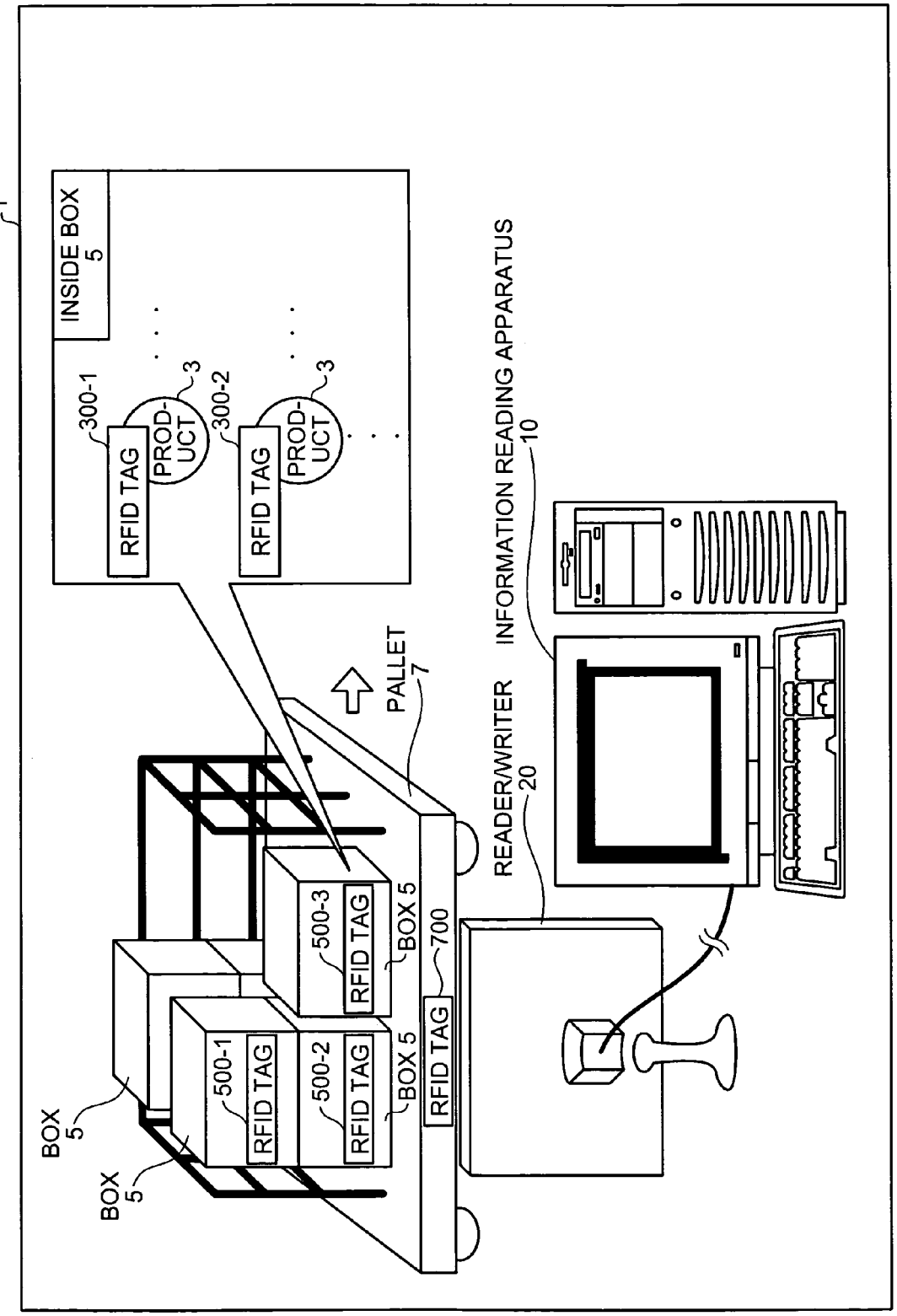
FIG. 11 is a schematic of an information reading system according to a third embodiment of the present invention.

FIG. 11 is a schematic of an information reading system according to a third embodiment of the present invention. In the first embodiment, the information reading system 1 includes two generations of tags, that is, the child tag attached to the product and the parent tag attached to the box that accommodates the products. In the third embodiment, the information reading system 1 includes three generations of tags, that is, a grandchild tag 300 attached to the product 3, a child tag 500 attached to the box 5, and a parent tag 700 attached to a pallet 7 on which the boxes 5 are mounted, as shown in FIG. 11. While an example of inspecting the quantity of the products 3 is explained in the first embodiment, an example of inspecting the quantity of the boxes 5 is explained in the third embodiment.

The information reading apparatus 10 according to the third embodiment controls to read identification information of the RFID tag 700 from the RFID tag 300, and controls to read, based on the identification information of the RFID tag 700 read, the identification information of a group of the RFID tags 500 from the RFID tag 700.

As explained above, the identification information of a parent tag is read not only from a child tag, but also from a grandchild tag, of which an absolute number is larger than that of the child tag. Such an arrangement in which the grandchild tag stores the identification information of the parent tag realizes quick recognition of the parent tag. Thus, the inspection processing can be efficiently carried out.

Only the differences from the first embodiment are explained below, and parts similar to those of the first embodiment are not explained. In the third embodiment, tag memory information 740, 540, and 340 stored in the parent tag, the child tag, and the grandchild tag are different from the tag memory information according to the first embodiment.

Figure 12:
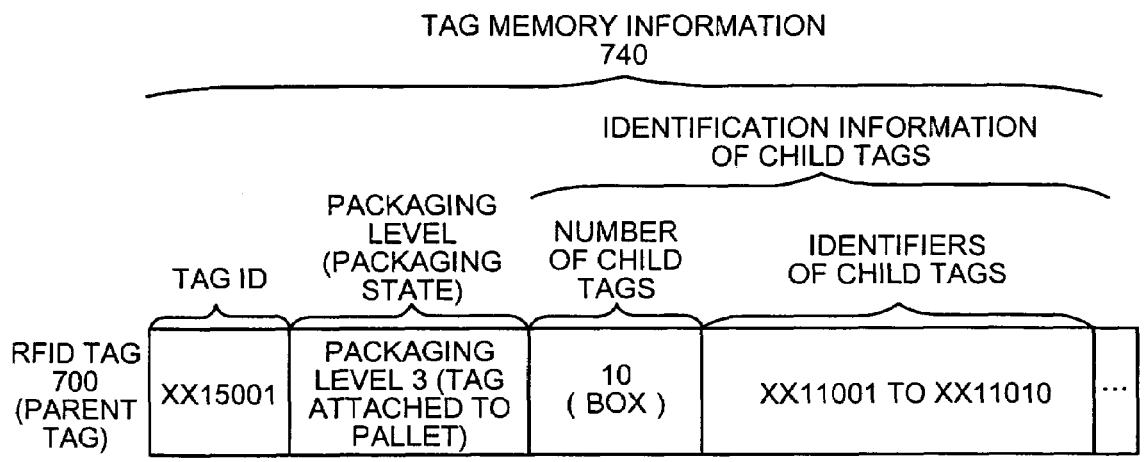
FIG. 12 is a schematic for illustrating information stored in a parent tag.

The RFID tag 700 stores information including a tag ID 740a, and identification information 740b of the child tag group, as the tag memory information 740. Specifically, as shown in FIG. 12, the RFID tag 700 stores a tag ID "XX15001" of the parent tag, a packaging level "3", and the identification information of the child tags, that is, a number "10" of child tags, and the identifiers "XX11001" to "XX11010" of the child tags. The "packaging level" is a mode of packaging of the product 3. For example, a packaging level "1" indicates the product 3 itself, the packaging level "2" indicates the box 5 in which the products 3 are accommodated, and the packaging level "3" indicates the pallet 7 on which the boxes 5 accommodating the products 3 are mounted.

Figure 13:
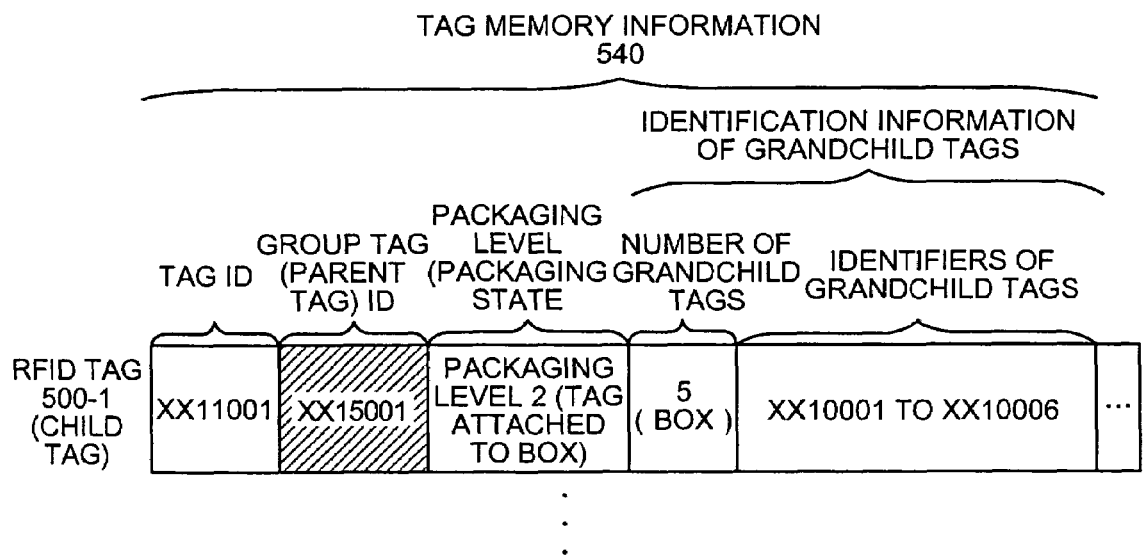
FIG. 13 is a schematic for illustrating information stored in a child tag.

The RFID tag 500 stores information including a tag ID 540a, a parent tag ID 540b, and identification information 540c of the grandchild tags as the tag memory information 540. Specifically, as shown in FIG. 13, the RFID tag 500 stores the tag ID "XX11001" of the child tag, the tag ID "XX15001" of the parent tag attached to the pallet 7, the packaging level "2" of the child tag, and identification information of the grandchild tags, that is, the number "5" of the grandchild tags, and identifiers "XX10001" to "XX10005" of the grandchild tags.

Figure 14:
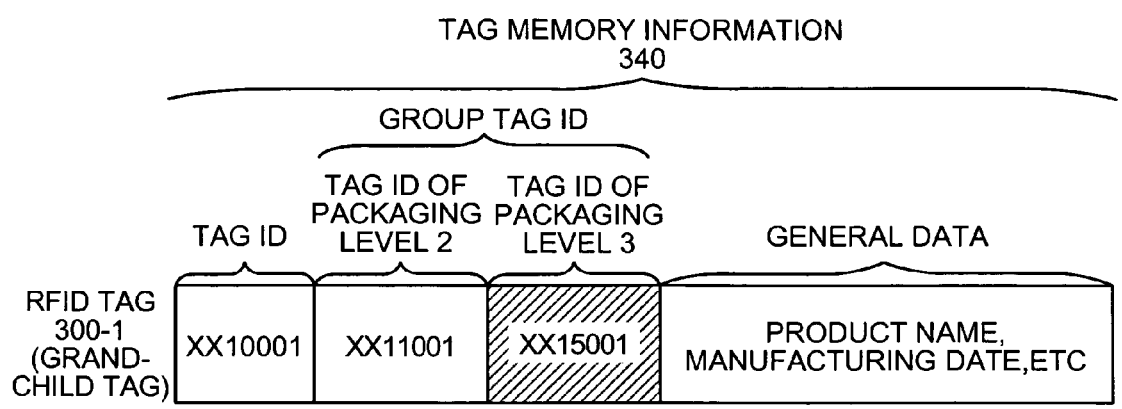
FIG. 14 is a schematic for illustrating information stored in a grandchild tag.

The RFID tag 300 stores information including the tag ID 340a, the child tag ID 340b, the parent tag ID 340c, and general data 34d, as the tag memory information 340. For example, as shown in FIG. 14, the RFID tag 300-1 stores the tag ID 340a "XX10001" of the grandchild tag, the tag ID "XX11001" of the child tag, the tag ID "XX15001" of the parent tag, and general data such as attribute information (for example, information of a product name and a manufacturing date) of the product 3.

FIG. 15 is a flowchart of the information read processing according to the third embodiment. As shown in FIG. 15, when it is detected that the pallet 7 is conveyed to the reading range of the reader/writer 20 ("YES" at step S1501), the information read controller 14a controls the reader/writer 20 to read the field of identification information of an arbitrary one of RFID tags (step S1502).

When the RFID tag of which identification information is read is a grandchild tag ("YES" at step S1503), that is, when there is no field of the packaging level (when the packaging level is "1"), the information read controller 14a controls the reader/writer 20 to read the identification information "XX15001" of the parent tag 700 having the packaging level "3" stored in the grandchild tag 300 (step S1504).

When the RFID tag of which identification information is read is a child tag ("NO" at step S1503 and "YES" at step S1505), that is, when the packaging level is "2", the information read controller 14a controls the reader/writer 20 to read the identification information "XX15001" of the parent tag 700 stored in the RFID tag 500 (step S1506).

The information read controller 14a specifies the identifier of the RFID tag 700, and controls to read the identification information (that is, the number "10" of child tags, and the identifiers "XX11001" to "XX11010" of the child tag groups) of the RFID tags from the RFID tag 700 (step S1507).

The information read controller 14a then specifies an identifier of the RFID tag 500, for example, the RFID tag 500-1, and controls to read the tag memory information 540 stored in the RFID tag 500-1 (step S1508). The RFID-tag number detector 14b increments the count number of the counter each time when the tag memory information 540 stored in the RFID tag 500 is read (step S1509).

The information read controller 14a repeats the read processing of the tag memory information 540 stored in this child tag until when all the identifiers "XX11001" to "XX11010" of the child tags are read ("YES" at step S1510).

When the reading of the tag memory information 540 of all the identifiers "XX11001" to "XX11010" of the child tags are read ("YES" at step S1510), the inspection processor 14c compares a number "10" of the child tags obtained from the RFID tag 700 with the total number of RFID tags detected by the RFID-tag number detector 14b, and determines whether both numbers coincide with each other (step S1511).

When the numbers of the RFID tags coincide with each other ("YES" at step S1511), the inspection processor 14c outputs a notice that the quantity inspection is finished normally, to the output unit 12 (step S1512). On the other hand, when the numbers of the RFID tags do not coincide with each other ("NO" at step S1511), the inspection processor 14c outputs an error message to the output unit 12 (step S1513), and ends the processing.

As explained above, according to the third embodiment, the information reading apparatus 10 reads the identification information of the parent tag from one of the grandchild tags, of which absolute number is larger than that of the child tags, so that the parent tag can be identified more quickly, thereby efficiently carrying out the inspection processing.

While the embodiments of the present invention are explained above, the present invention is not to be limited to the embodiments and may also be applied to various kinds of different modifications of the embodiments within the scope of the technical ideas of the present invention.

For example, in the first, the second, and the third embodiments, passive type RFIb tags that provide tag memory information in response to the read request of the tag memory information from the reader/writer 20 are used as an example. However, the present invention can be similarly applied to active type RFID tags for autonomously providing the tag memory information.

In the first, the second, and the third embodiments, the information reading apparatus 10 includes the information read controller 14a as the function unit that executes the present invention. However, the present invention is not limited to this. The reader/writer 20 or a high-level server can also have the functions of the information read controller 14a.

Each of the processes in the embodiments, all or a part of the processes explained as being performed automatically may be performed manually, or all or a part of the processes explained as being performed manually may be performed automatically in a known method. The information including the procedures of the processing and the control, specific names, and various kinds of data and parameters explained can be optionally changed, unless otherwise specified.

Each of the constituents of the apparatus is conceptually illustrated, and the constituents are not always necessary to be physically the same as that illustrated. In other words, the specific mode of dispersion and integration of the apparatus is not limited to that illustrated, and all or a part thereof may be functionally or physically dispersed or integrated in an arbitrary unit depending on loads and a mode of use. Furthermore, all or an optional part of the various processing functions performed by the apparatus can be realized by a central processing unit (CPU) or a program executed by the CPU, or can be realized as hardware by the wired logic.

According to the present invention, it is possible to obtain an information reading apparatus that can automatically recognize the group RFID tag even when the RFID tag attached to each product and the group RFID tag attached to a product group, to which each product belongs, are present in a mixed state. Furthermore, even when the number of tags increases, products can be inspected efficiently without a delay or a reading error in the inspection processing.

Moreover, according to the present invention, it is possible to obtain an information reading apparatus that can read the identification information of a group of parent tags to be read, from one of the parent tags, thereby preventing making an error in reading of information stored in parent tags other than the parent tag, from which the identification information is read, and information store in the child tag belonging to the parent tag.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information reading apparatus that reads first information stored in at least one first radio frequency identification tag and second information stored in a second radio frequency identification tag that belong to a first group, the first information including second identification information of the second radio frequency identification tag, the second information including first identification information of the first radio frequency identification tag, the information reading apparatus comprising:
a control unit that controls a reading unit to read the first information from one of the first radio frequency identification tags to obtain the second identification information, and to read, based on the second identification information obtained, the second information to obtain the first identification information of all of the first radio frequency identification tags that belong to the first group.

2. The information reading apparatus according to claim 1, wherein
the first group belongs to a second group to which a third radio frequency identification tag belongs, the third radio frequency identification tag including third information, the third information including the second identification information,
the first information further includes third identification information of the third radio frequency identification tag, and
the control unit controls the reading unit to read the first information from one of the first radio frequency identification tags to obtain the third identification information, and to read, based on the third identification information obtained, third information to obtain the second identification information of all of the second radio frequency identification tags that belong to the second group.

3. The information reading apparatus according to claim 1, wherein
the first group belongs to a second group including a plurality of the second radio frequency identification tags, the second information of each of the second radio frequency identification tags including the second identification information of all of the second radio frequency identification tags that belong to the second group, and
the control unit controls the reading unit to read the first information from one of the first radio frequency identification tags to obtain the second identification information of one of the second radio frequency identification tags, and to read, based on the second identification information obtained, the second information to obtain the second identification information of all of the second radio frequency identification tags that belong to the second group.

4. An information reading system, comprising:
at least one first radio frequency identification tag that is attached to at least one product, the first radio frequency identification tag including first identification information;
a second radio frequency identification tag that is assigned to a predetermined group to which a plurality of the first radio frequency identification tags belong, the second radio frequency identification tag including second identification information; and an information reading apparatus that reads information stored in the first radio frequency identification tag and the second radio frequency identification tag, wherein the first radio frequency identification tag includes a storage unit that stores the second identification information, and the information reading apparatus includes a control unit that controls a reading unit to read the second identification information stored in the storage unit from one of the first radio frequency identification tags, and to read, based on the second identification information read, the first identification information of all of the first radio frequency identification tags that belong to the predetermined group from the second radio frequency identification tag.

\* \* \* \* \*